United States Patent
Doyle et al.

(10) Patent No.: US 6,823,452 B1
(45) Date of Patent: Nov. 23, 2004

(54) PROVIDING END-TO-END USER AUTHENTICATION FOR HOST ACCESS USING DIGITAL CERTIFICATES

(75) Inventors: Ronald P. Doyle, Raleigh, NC (US); Julie H. King, Raleigh, NC (US); Steven W. Pogue, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/466,625

(22) Filed: Dec. 17, 1999

(51) Int. Cl.[7] .............................. H04L 9/00; H04K 1/00; G06F 11/30; G06F 12/14
(52) U.S. Cl. ...................... 713/156; 713/200; 713/201; 713/202; 713/183; 713/185; 707/9; 707/10; 705/51; 705/65; 705/21; 705/8
(58) Field of Search ................................. 713/200, 201, 713/202, 156, 183, 185; 705/51, 65, 21, 8; 707/9, 10

(56) References Cited

U.S. PATENT DOCUMENTS

| | | | | |
|---|---|---|---|---|
| 5,241,594 A | * | 8/1993 | Kung ......................... | 713/151 |
| 5,592,553 A | * | 1/1997 | Guski et al. ................ | 713/159 |
| 5,655,077 A | * | 8/1997 | Jones et al. ................ | 713/201 |
| 5,754,830 A | * | 5/1998 | Butts et al. ................. | 719/311 |
| 5,922,074 A | * | 7/1999 | Richard et al. ............. | 713/200 |
| 5,944,824 A | * | 8/1999 | He ............................. | 713/201 |
| 6,052,785 A | * | 4/2000 | Lin et al. .................... | 713/201 |
| 6,067,623 A | * | 5/2000 | Blakley, III et al. ........ | 713/201 |
| 6,275,941 B1 | * | 8/2001 | Saito et al. ................. | 713/201 |
| 6,401,211 B1 | * | 6/2002 | Brezak et al. .............. | 713/201 |
| 6,442,692 B1 | * | 8/2002 | Zilberman .................. | 713/184 |
| 6,556,995 B1 | * | 4/2003 | Child et al. .................... | 707/9 |
| 2003/0041263 A1 | * | 2/2003 | Devine et al. .............. | 713/201 |

OTHER PUBLICATIONS

IBM Technical Bulletin, Customized Handling of Application Errors under OS/2, Apr. 1, 1992, vol. 34, pp. 459–461.*
Schneier, Applied Cryptography, 1996, John Wiley & Sons, Inc., Second Edition, 574–575.*
Davies, Computer Networks and Their Protocols, 1979, John Wiley& Sons, Inc., 355–388.*
Bruce Thompson, Safety in Cyberspace: PLanning Effective Web–to–Host Access Security, Aug. 1999, Enterprise Systems Journal.*

* cited by examiner

Primary Examiner—Kim Vu
Assistant Examiner—Allen S. Wu
(74) Attorney, Agent, or Firm—Marcia L. Douber; Jeanine S. Ray-Yarletts

(57) ABSTRACT

A method, system, and computer program product for using a digital certificate to access legacy host applications and/or data which are protected by a host-based security system such as RACF (Resource Access Control Facility, a product offered by the IBM Corporation) and which typically require a separate user identification and password. Use of the present invention enables the client to access the host applications and/or data using a single system log on, without requiring modification to host programs.

26 Claims, 6 Drawing Sheets

PROVIDING END-TO-END USER AUTHENTICATION FOR HOST ACCESS USING DIGITAL CERTIFICATES

BACKGROUND OF THE INVENTION

1. Field of the Invention

The present invention relates to a computer system, and deals more particularly with a method, system, and computer program product for providing end-to-end user authentication using digital certificates for accessing host applications and data without requiring modification of existing host applications.

2. Description of the Related Art

One of the challenges facing information services ("IS") professionals today is the difficulty of providing secure access to legacy mainframe host data and applications from modern personal computer-based ("PC-based") applications. As more large companies move to provide business integration and self-service on the World Wide Web (hereinafter, "Web"), there is most often data that is crucial to this movement, but which is based on (and is only accessible through) legacy mainframe host applications. These host applications and their data have, from their origin, been typically protected through the use of the program product commonly referred to as "RACF" (Resource Access Control Facility) or other similar mainframe-based security systems. ("RACF" is a registered trademark of the IBM Corporation.) These mainframe-based security systems typically require a user identification and password in order to gain access to the protected applications and data. Therefore, when a user tries to access data or legacy applications on a host mainframe from a client workstation over a network connection, they normally must provide a separate user identification and password to the host application to satisfy the security requirements of the host security system in addition to the user identification and password they use to access the modern environments (e.g. to access the Internet or Web). This double entry of identifying information is not only redundant but tedious for the user as well.

With the wide-spread use of SSL (Secure Sockets Layer) and certifiable digital certificates for providing security in today's PC-based computing environments, there is a desire to use a client certificate as the basis for a "single system log on" to all of a user's Internet-based applications. This includes applications that provide access to legacy host applications and/or data such as IBM's Host-On-Demand, Personal Communications, and Host Publisher products. Digital certificates are used to authenticate entities, as is well known in the art. U.S. Pat. No. 6,129,738 (Ser. No. 09/064,632, filed Dec. 10, 1998), which is titled "Certificate Based Security in SNA Data Flows", teaches a technique whereby digital certificates are transported in appropriate Systems Network Architecture ("SNA") data flows between a client and a host for identifying the user to the host application, but this existing technique requires those host programs which authenticate the user to RACF (or other host access control facility) to be modified to use the certificate instead of the traditional userid and password. This requires an enterprise to upgrade each of its application subsystems in order to achieve the benefits. So for some enterprises, the previous approach may be impractical and unacceptable.

Accordingly, what is needed is a technique that provides a single system log on that allows a host-based, legacy security system to authenticate a client from the newer PC-based, distributed computing environments without requiring the client to supply an additional user name (or other user identifier) and password. This technique must allow current legacy applications to function without requiring any modification thereof.

SUMMARY OF THE INVENTION

An object of the present invention is to provide a technique for using a single system log on to access legacy host applications and data in a distributed networking environment.

Another object of the present invention is to provide this technique without requiring any modification to the existing legacy host applications.

Yet another object of the present invention is to provide this technique by using digital certificates to authenticate clients.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a computer program product, system, and method for providing end-to-end user authentication for legacy host application access in a computing environment. This technique comprises: establishing a secure session from a client machine to a server machine using a digital certificate representing the client machine or a user thereof; storing the digital certificate at the server machine; establishing a session from the server machine to a host system using a legacy host communication protocol; passing the stored digital certificate from the server machine to a host access security system; using, by the host access security system, the passed digital certificate to locate access credentials for the user; accessing a stored password or a generated password substitute representing the located credentials; and using the stored password or the generated password substitute to transparently log the user on to a secure legacy host application executing at the host system.

The digital certificate may be an X.509 certificate. The communication protocol may be a 3270 emulation protocol. Or, it may be a 5250 emulation protocol or a Virtual Terminal protocol. The host access security system may be a Resource Access Control Facility (RACF) system.

The technique may further comprise: requesting by the legacy host application, responsive to establishing the session, log on information for the user, responding to the request for log on information by sending a log on message with placeholders from the client machine to the server machine, these placeholders representing a user identification and a password of the user; and substituting a user identifier associated with the located access credentials and the stored password or the generated passticket for the placeholders in the log on message.

In one aspect, the server machine may be a Web application server machine. In this case, the technique may further comprise: requesting by the legacy host application, responsive to establishing the session, log on information for the user; and responding to the request for log on information by supplying a user identifier associated with the located access credentials and the stored password or the generated passticket at the server machine.

The present invention will now be described with reference to the following drawings, in which like reference numbers denote the same element throughout.

DESCRIPTION OF THE PREFERRED EMBODIMENTS

Figure 1:
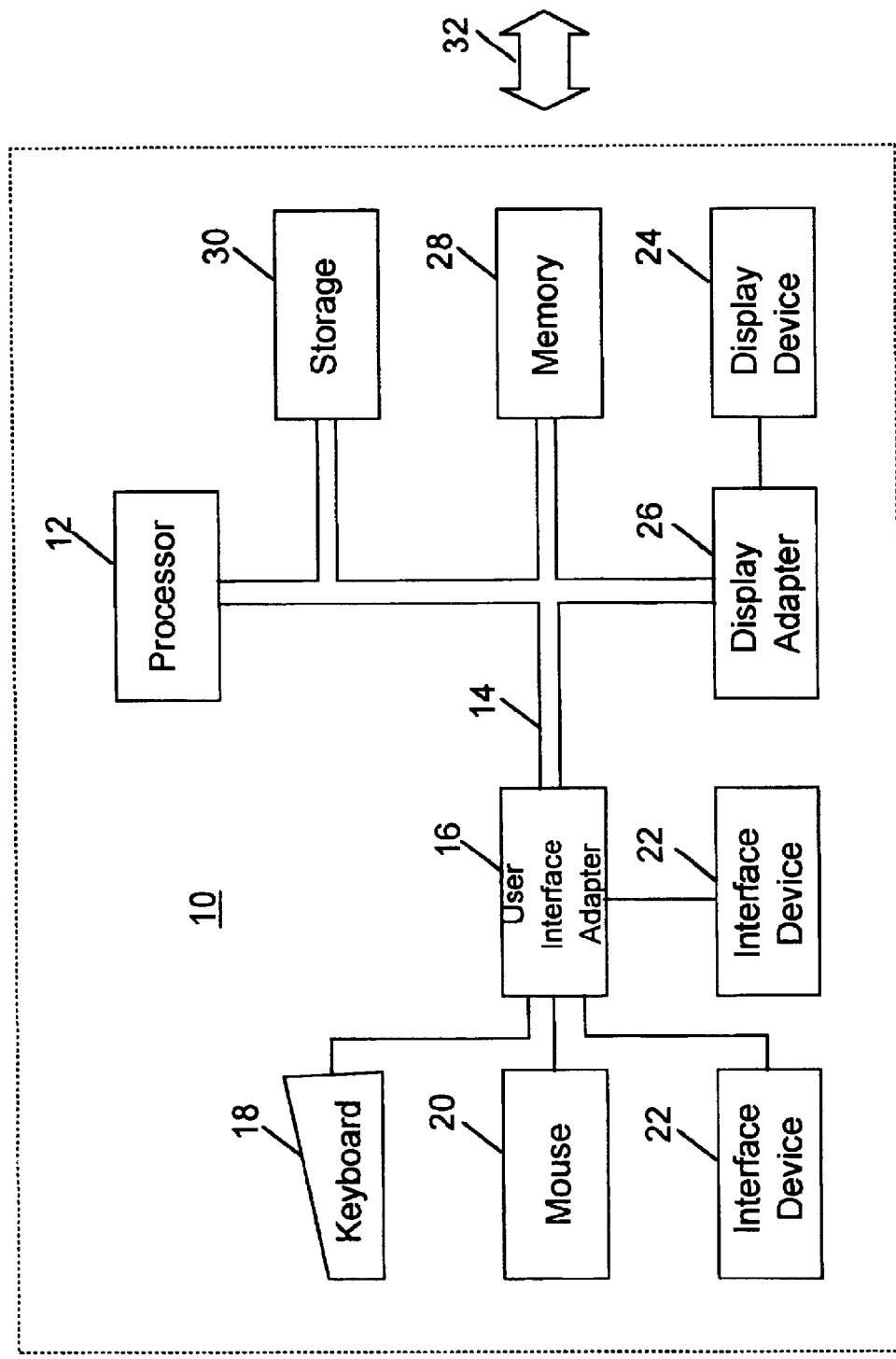
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, the workstation 10 can be a client in a client/server arrangement with another computer, etc. All of these configurations, as well as the appropriate communications hardware and software, are known in the art.

Figure 2:
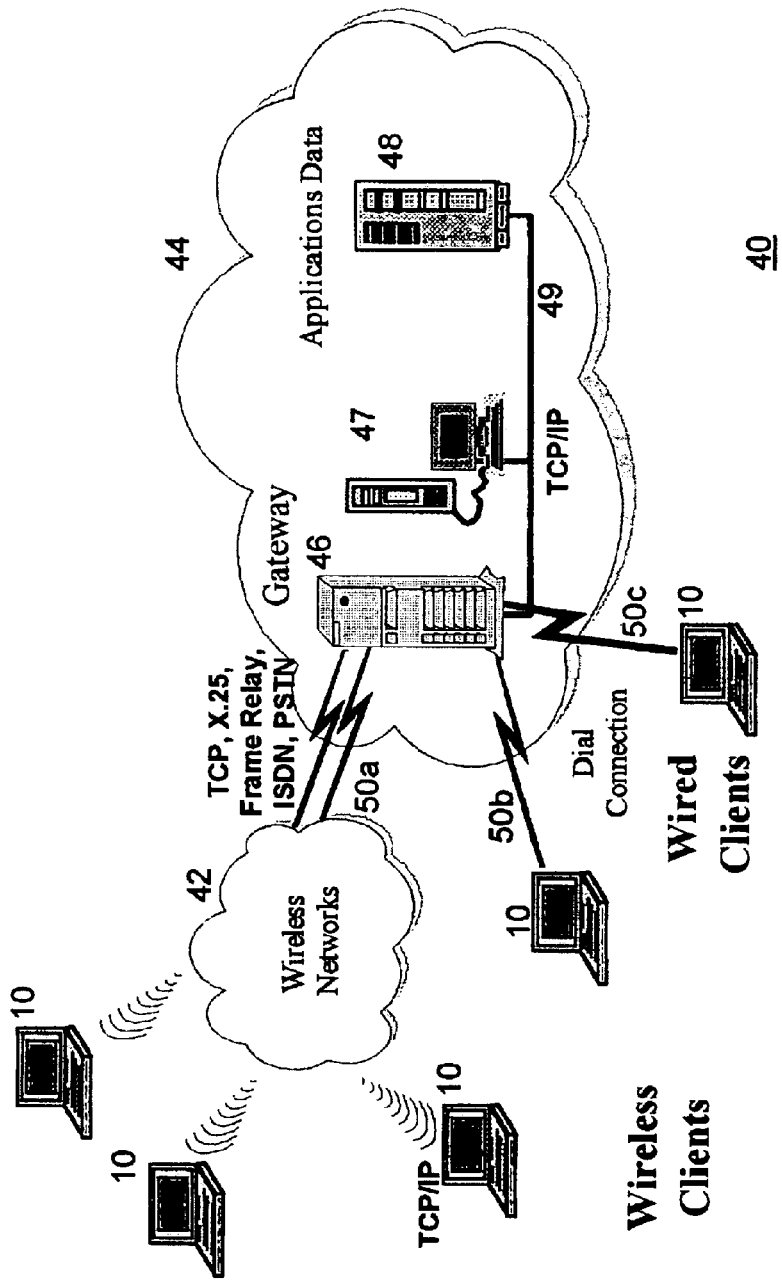
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "enterprise Systems Architecture/390", "Application System/400", and "AS/400" are registered trademarks of IBM)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programing code which embodies the present invention is typically accessed by the microprocessor 12 of workstation 10 and server 46 from long-term storage media 30 of some type, such as a CD-ROM drive or hard drive. The software programing code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiments, the present invention is implemented as one or more modules (also known as "objects" in object-oriented programming languages) of one or more computer software programs. This computer software will be used in an environment where a user in a modern distributed computing environment is accessing a host legacy application where the application and/or data it uses is protected by a host-based security system (such as RACF).

The preferred embodiments of the present invention enable a user to provide a single system log on for accessing applications and data during the user's session, whether the applications and data are available from a modern PC-based environment such as the Internet or whether they are available only through a legacy host application which is protected by a host-based security system.

The preferred embodiments of the present invention will now be discussed with reference to FIGS. 3 through 6.

Figure 3:
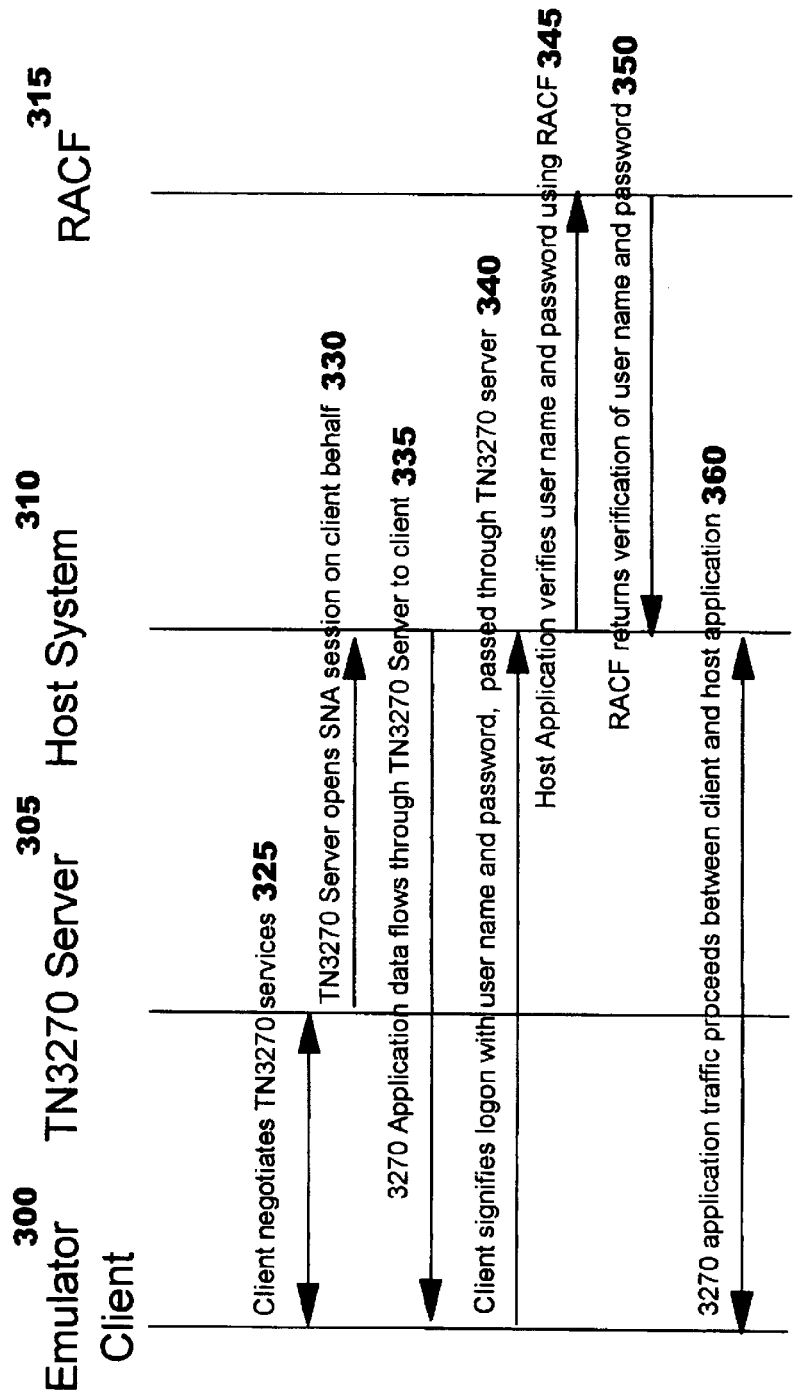
FIG. 3 illustrates message flows for authentication of a user between a typical PC-based user and a host-based application, according to the prior art.

FIG. 3 illustrates message flows that may be used for authenticating a user by a legacy host application according to the prior art. When a user at a client device wishes to work with a legacy host application and/or data, the client device must use some form of emulation or emulator product to allow communication between the distributed computing environment and the host application. In the example of FIG. 3, the client is using an emulator product which uses the TN3270 emulation protocol. The TN3270 protocol is used to provide emulation of the "3270 data stream", as is well known to those familiar with the art. The 3270 data stream is frequently used for information transfer to and from legacy host applications, and is so named because it was originally designed for use with IBM Model 327x client worktations.

Note that while the examples describing the present invention are discussed with reference to the 3270 data stream format, this is for purposes of illustration and not of limitation. Other data stream formates may be used alternatively. Another commonly used data stream format for communicating with legacy host applications is referred to as a "5250 data stream", originally designed for communicating with IBM Model 525x workstations. The TN5250 emulation protocol is used with a 5250 data stream. Yet another commonly used data steam is an ASCII data stream, commonly referred to as a "Virtual Terminal" or "VT" data stream.

When a user in the modern distributed computing environment begins working in a secure environment, he is asked to provide a user identification and password which is used to authenticate who the person is and typically what resources this particular user is authorized to access.

To begin the process depicted in FIG. 3, the client, using software such as emulator client 300, negotiates at 325 with the server 305 for the services required to allow the user to communicate with the host application. At 330, the server 305 opens an SNA session with the host system 310 on behalf of the client 300. At 335, the host application sends application data formatted as a 3270 data stream to the client 300. This data passes through the server 305 where it is transformed from a 3270 data stream to a data stream (such as a standard TN3270 data stream) suitable for the emulator client. This initial data from the host application is typically some type of "log on" screen asking for a user name (or other user identifier) and password. It should be noted that at this point, no interaction with the RACF program 315 has occurred, since the host application is responsible for providing the client's user name and password to the RACF system for authentication. At 340, the client signifies a log on to the host application by providing a user name and password. This data flows to the server 305 where it is transformed to a 3270 data stream format, which is then sent to the host system 310 (and application) for processing. The host application then forwards (at 345) the user name and password to the RACF system 315 for authentication. The authentication is performed using the supplied user name and password. The RACF system then responds 350 to the host application with either a success or failure of the authentication process. If the authentication was successful, the host application then begins normal communication with the client (as shown at 360).

As the move towards distributed computing and use of the Internet continues, it is anticipated that enterprises will require use of digital certificates and standardized security protocols (such as SSL) for authentication of users who wish to access the enterprise applications and data. A digital certificate may be generated for a user using techniques which are known in the art, for example by contacting a certificate authority which issues such certificates. Techniques for obtaining a digital certificate do not form part of the present invention. Once a digital certificate is generated for a user, the certificate may be used according to the present invention for accessing resources in the modern distributed computing environment which are protected by host access control facilities such as RACF. A certificate conforming to the X.509 standard (hereinafter referred to as an "X.509 certificate") is used in the preferred embodiments of the present invention, although other digital certificate formats may be used alternatively without deviating from the scope of the present invention. "X.509" is an International Telecommunication Union (ITU) Recommendation and International Standard that defines a framework for providing authentication. (See ITU Recommendation X.509 (1997), titled "Information Technology—Open Systems Interconnection—The Directory: Authentication Framework", dated August 1997. This information is also published in International Standard ISO/IEC 9594-8 (1995).) A certificate format is defined in this standard. Certificates created according to this international standard, in the defined format, are referred to as "X.509 certificates".

Figure 6:
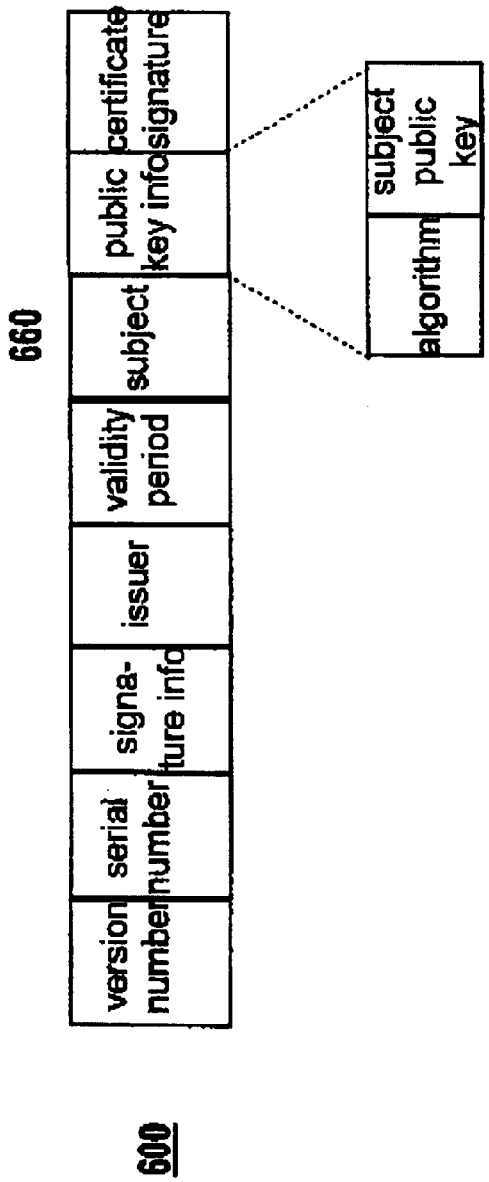
FIG. 6 depicts the format of an X.509 certificate that may be used with the preferred embodiments of the present invention.

The format of an X.509 certificate is shown in FIG. 6. Hereinafter, references to "certificates" refer to the type of information shown in FIG. 6. The subject field 660 identifies the entity (e.g. the user) to which this certificate was issued. The preferred embodiments of the present invention use this subject field to identify the user, where this identification process is automatic and transparent to the user himself. In this manner, the need for the user to explicitly (and redundantly) re-identify himself for purposes of communicating with a legacy host application and its security system is avoided.

The technique with which a digital certificate is used for authentication is well known in the art and will not be described in detail herein. For purposes of the example embodiments discussed below with reference to FIGS. 4 and 5, it is assumed that the user has already been issued a digital certificate and that this certificate is stored in such a manner that it is locally accessible to the client software operating on the user's workstation.

Figure 4:
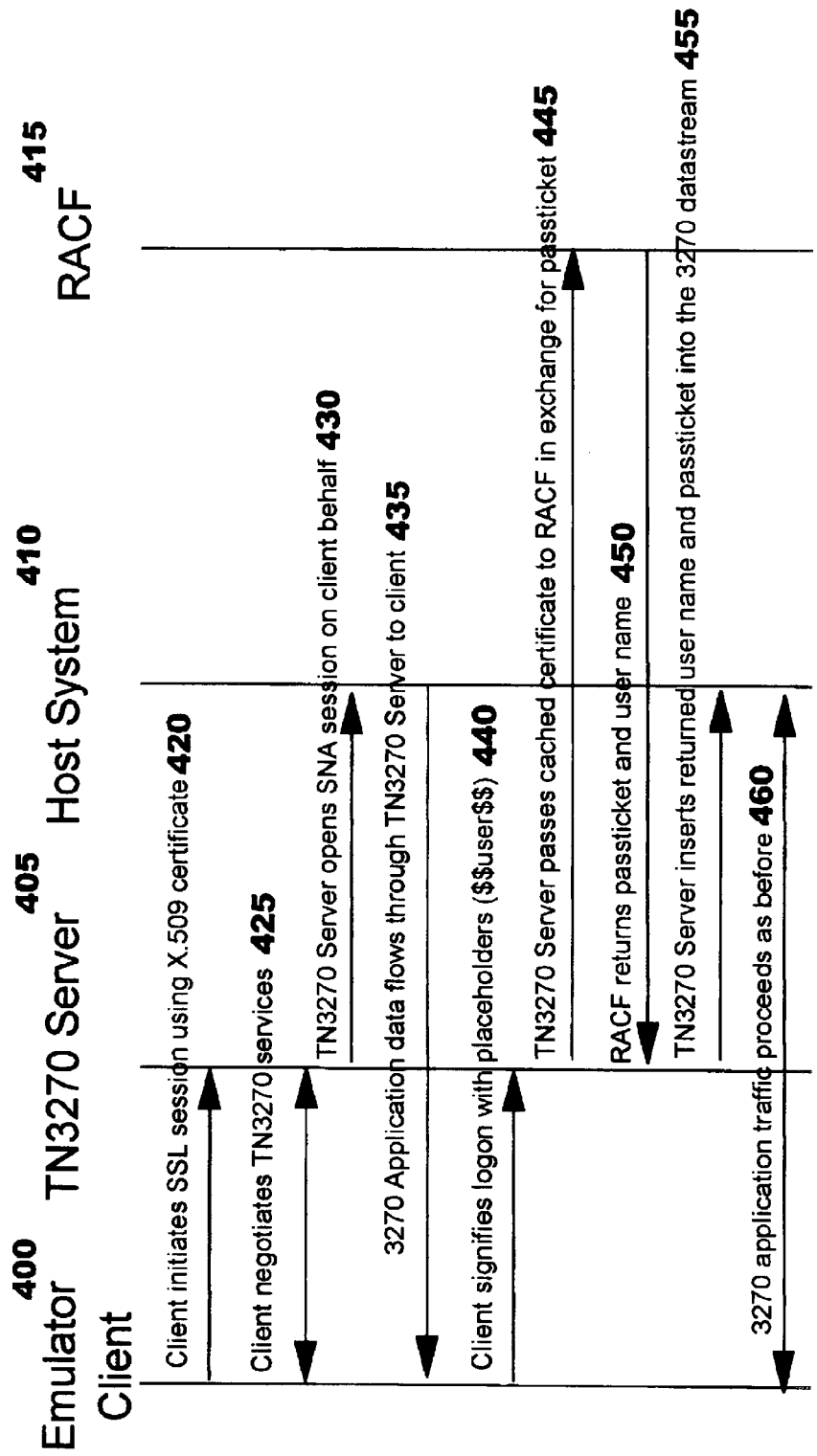
FIG. 4 illustrates message flows for authentication of a user according to a first preferred embodiment of the present invention operating in a distributed computing environment.

FIG. 4 illustrates message flows in a distributed computing environment for authenticating a user according to a first preferred embodiment of the present invention. As indicated in FIG. 4, the emulator client at 420 initiates an SSL session and provides a digital certificate to the server 405. As stated above, it is assumed that this digital certificate is already available at the client machine.

The server authenticates the client using the client's digital certificate as part of the existing SSL session establishment procedure. The server then, according to the present invention, caches (or otherwise stores) the certificate for later use. Negotiation 425 of the session parameters between the client and the server then occurs as in the prior art. Since this client 400 desires to interact with the host system 410, the server 405 initiates 430 an SNA session on behalf of the client with the host system 410. The host then responds at 435 with the host application initiation data (e.g. a request for supplying user identification and password information), which flows through the server 405 to the client 400. The client software at 440 responds to the server 405 with an indication that the client wishes to log on to the host application. Rather than prompting the user to explicitly identify himself (for example, by typing in his identifier and password) as in the prior art (see the prior discussion of element 340 of FIG. 3), the present invention automatically (and transparently to the user) inserts placeholders in response 440. Note that the placeholder is represented in 440 as having the syntax "$$user$$". This is merely an example of a placeholder syntax which may be used. Alternative placeholder syntax may be substituted without deviating from the inventive concepts disclosed herein. Furthermore, separate placeholders may be used for the user identifier and the password, or a single placeholder may be used for both. What is required is that the client software 460 and the software operating at server 405 agree on a particular syntax to represent that a placeholder is being transmitted.

Upon receiving message 440 and detecting the presence of the placeholders, the server locates the client's cached X.509 certificate, which was obtained at 420 during SSL session establishment. This cached certificate is then passed in flow 445 to the host-based RACF 415 software. The RACF system extracts the user's identification from the subject field of the client certificate, and uses this information to locate the user's stored credentials and access privileges. For example, the value of the subject field may be used as a key to access a stored repository of credentials, where the data in the repository has been previously created by a person such as a systems administrator. Or, the subject field may be used to access a lookup table of such information, or to access a lookup table which provides a correlation to a key used to access a credential repository (such as a subject value-to-credential key correlation). The manner in which the credentials are stored is outside the scope of the present invention.

The RACF secured sign-on procedure is then invoked at the RACF implementation 415, using techniques which are known in the art. "RACF secured sign-on" is a procedure for enabling clients to sign on to a host and communicate securely without sending RACF passwords across a network. Instead, a dynamically-generated short-lived credential referred to as a "passticket" is generated by the RACF software as a password substitute. Passtickets, and the procedure with which they are generated, are known in the art. As an alternative (for example, in other host access systems other than RACF) to generating a passticket, an actual password may be retrieved by the host access security system, where this password may then be used directly instead of using a passticket as a password substitute. Hereinafter, references to "passticket" are to be interpreted as referring equivalently to use of a password supplied by the host access security system.

According to the present invention, the passticket represents the access privileges for the user identified by the subject field of the digital certificate transmitted at 445. The RACF software 415 sends 450 this passticket to the server, along with the user name (or identification) to which it corresponds (i.e. the user name associated with the credentials represented by the passticket). The server at 455 then inserts the returned user name and passticket into the 3270 data stream in place of the placeholders (completing the log on request message 440 from the client software 400), and sends the resulting data stream to the host 410. Using this passticket and user identification data, the legacy host application can determine the user's access privileges in the manner with which it has already been programmed. The host application and the client interact as shown at 460, without requiring modification of the host application.

Figure 5:
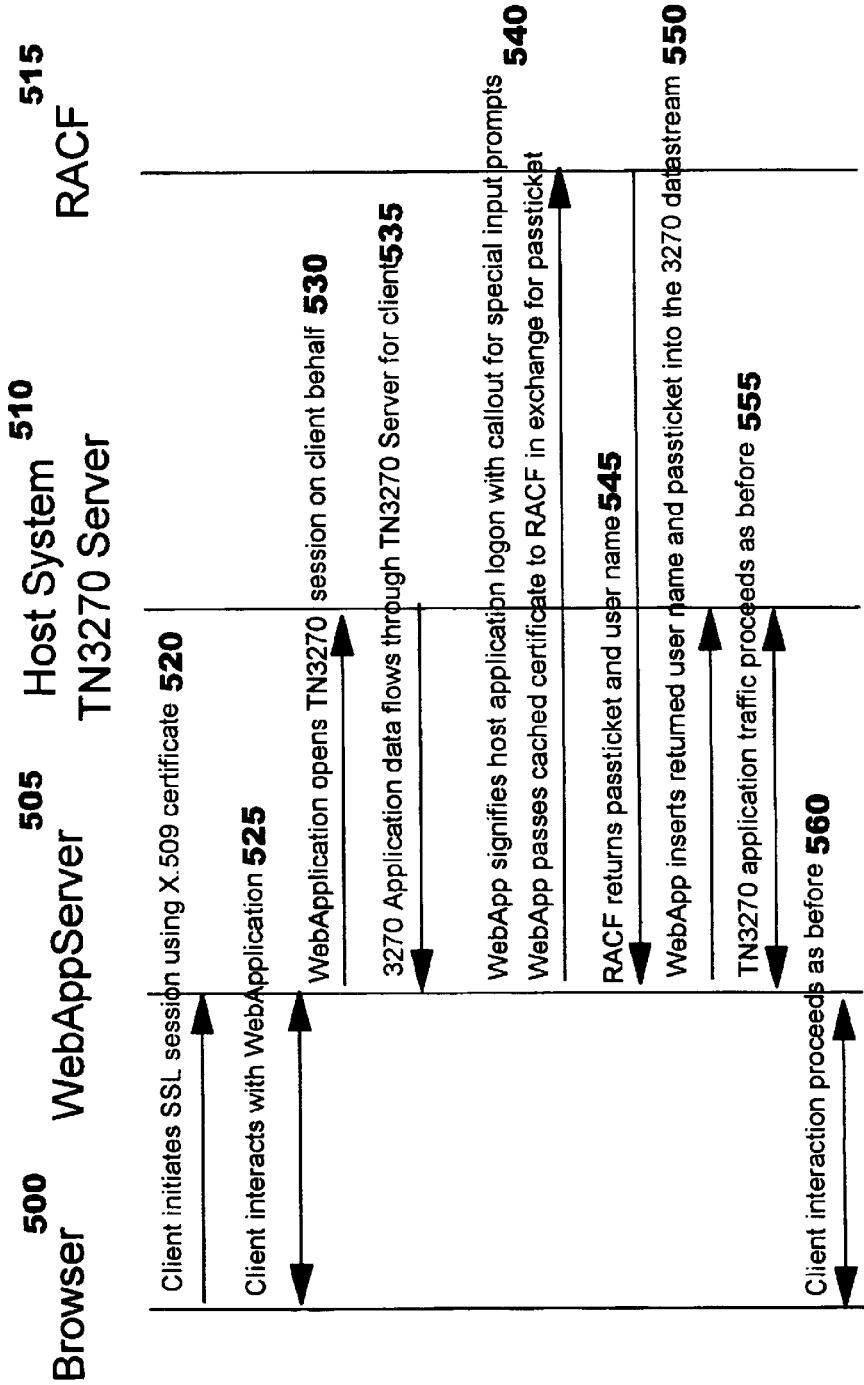
FIG. 5 illustrates message flows for authentication of a user according to a second preferred embodiment of the present invention operating in a Web Application environment.

FIG. 5 illustrates message flows of the present invention in a Web application environment according to a second preferred embodiment of the present invention. As indicated in FIG. 5, the client's browser 500 at 520 initiates an SSL session and provides a digital certificate (preferably an X.509 certificate, as previously described in the discussion of the first preferred embodiment with reference to the certificate 600 of FIG. 6) to the Web application server 505. The Web application server 505 authenticates the client using this digital certificate as in the prior art and, according to the present invention, caches (or otherwise stores) the certificate for later use. The client 500 then begins interaction with the Web application server 505 at 525. Since the client desires to interact with the host system 510, the Web application server 505 initiates a 3270 session (using the TN3270 emulation protocol) at 530 with the host server 510 located on a host machine. (As described above, other data stream formats and other emulation procedures may be used alternatively without deviating from the inventive concepts disclosed herein.) The 3270 data stream application data flows at 535 from the host application at 510 to the Web application server 505. (Note that in the scenario depicted in FIG. 5, the Web application server 505 is functioning as a proxy for client 500, intercepting and responding to messages on behalf of the client software. Thus, the client software 500 may operate without change in this preferred embodiment.)

The Web application server at 540 signifies to the host server that the client wishes to log on to the application. Typically, a callout procedure exists in the application software executing on the Web application server 505 which, in the prior art, would prompt the user with special input prompts (for example, by presenting a Web page form for the user to fill in) to supply his identification and password information. According to the present invention, however, the Web application server application software automatically and transparently uses the cached client's certificate 600 (which was obtained during flow 520) to supply this information. The Web application server locates the previously-stored client certificate, and includes it in message 540 which is sent to the RACF implementation 515. As described above with reference to FIG. 4, RACF uses the digital certificate to extract a user name (from subject field 660) and to generate a passticket representing the credentials of that user after accessing stored credential information. At 545, RACF returns the user name and passticket through the host server 510 to the Web application server 505. According to the present invention, in response to receiving message 545, the Web application server 505 inserts the user name and passticket information into the 3270 data stream expected by the host application and sends it, at 550, to the host server 510. The legacy host application uses this information to allow the user to access protected applications and/or data, with requiring changes to the host application itself. Traffic flows between the host server 510 and the Web application server 505 at 555 as in the prior art. Interaction between the legacy host application and client 500 (shown at 560) occurs also as in the prior art.

While the preferred embodiment of the present invention has been described, additional variations and modifications in that embodiment may occur to those skilled in the art once they learn of the basic inventive concepts. In particular, alternative data streams (such as a 5250 data stream or a VT data stream) may be used which provide the communications between the user's modern PC-based computer system and the legacy host applications and data. Further, security software other than the IBM RACF software may be used for protecting host-based assets. Therefore, it is intended that the appended claims shall be construed to include both the preferred embodiment and all such variations and modifications as fall within the spirit and scope of the invention.

What is claimed is:

1. A computer program product for providing end-to-end user authentication for legacy host application access, said computer program product embodied on a computer-readable medium readable by a computing device in a computing environment and comprising:

computer-readable program code means for establishing a secure session from a client machine to a server machine using a digital certificate transmitted from said client machine to said server machine wherein said digital certificate represents said client machine or a user thereof;

computer-readable program code means for storing said transmitted digital certificate at said server machine;

computer-readable program code means for establishing a session from said server machine to a host system on behalf of said client machine, responsive to establishment of said secure session, using a legacy host communication protocol;

computer-readable program code means for automatically sending a log-on message from said client machine to said server machine, responsive to receiving, at said client machine, a request from said host system for log-on information of said user, wherein said log-on message uses placeholder syntax in place of a user identifier and a password of said user;

computer-readable program code means for passing said stored digital certificate from said server machine to a host access security system, responsive to receiving, at said server machine, said log-on message from said client machine;

computer-readable program code means, operable in said host access security system, for using said passed digital certificate to locate access credentials for said user;

computer-readable program code means for returning, from said host access credentials and system to said server machine, a user identifier associated with said located access credentials and either a stored password or a generated password substitute representing said located credentials;

computer-readable program code means for modifying, by said server machine, said received log-on message by replacing said placeholder syntax with said returned user identifier and password or password substitute; and computer-readable program code means for forwarding said modified log-on message from said server to said host system as a response to said request for log-on information, such that said user identifier and password or password substitute from said forwarded log-on message can be used by said host system to transparently log said user on to a secure legacy host application executing at said host system, without requiring change to said host system.

2. A system for providing end-to-end user authentication for legacy host application access in a computing environment, comprising:

means for establishing a secure session from a client machine to a server machine using a digital certificate transmitted from said client machine to said server machine, wherein said digital certificate represents said client machine or a user thereof;

means for storing said transmitted digital certificate at said server machine;

means for establishing a session from said server machine to a host system on behalf of said client machine, responsive to establishment of said secure session, using a legacy host communication protocol;

means for automatically sending a log-on message from said client machine to said server machine, responsive to receiving, at said client machine, a request from said host system for log-on information of said user, wherein said log-on message uses placeholder syntax in place of a user identifier and a password of said user;

means for passing said stored digital certificate from said server machine to a host access security system, responsive to receiving, at said server machine, said log-on message from said client machine;

means, operable in said host access security system, for using said passed digital certificate to locate access credentials for said user;

means for returning, from said host access security system to said server machine, a user identifier associated with said located access credentials and either a stored password or a generated password substitute representing said located credentials;

means for modifying, by said server machine, said received log-on message by replacing said placeholder syntax with said returned user identifier and password or password substitute; and means for forwarding said modified log-on message from said server to said host system as a response to said request for log-on information, such that said user identifier and password or password substitute from said forwarded log-on message can be used by said host system to transparently log said user on to a secure legacy host application executing at said host system, without requiring change to said host system.

3. A method for providing end-to-end user authentication for legacy host application access in a computing environment, comprising steps of:

establishing a secure session from a client machine to a server machine using a digital certificate transmitted from said client machine to said server machine, wherein said digital certificate represents said client machine or a user thereof;

storing said transmitted digital certificate at said server machine;

establishing a session from said server machine to a host system on behalf of said client machine, responsive to establishment of said secure session, using a legacy host communication protocol;

automatically sending a log-on message from said client machine to said server machine, responsive to receiving, at said client machine, a request from said host system for log-on information of said user, wherein said log-on message uses placeholder syntax in place of a user identifier and a password of said user;

passing said stored digital certificate from said server machine to a host access security system, responsive to receiving, at said server machine, said log-on message from said client machine;

using, by said host access security system, said passed digital certificate to locate access credentials for said user;

returning, from said host access security system to said server machine, a user identifier associated with said located access credentials and either a stored password or a generated password substitute representing said located credentials;

modifying, by said server machine, said received log-on message by replacing said placeholder syntax with said returned user identifier and password or password substitute; and forwarding said modified log-on message from said server to said host system as a response to said request for log-on information, such that said user identifier and password or password substitute from said forwarded log-on message can be used by said host system to transparently log said user on to a secure legacy host application executing at said host system, without requiring change to said host system.

4. The method as claimed in claim 3, wherein said digital certificate is an X.509 certificate.

5. The method as claimed in claim 3, wherein said communication protocol is a 3270 legacy host communication protocol.

6. The method as claimed in claim 3, wherein said communication protocol is a 5250 emulation legacy host communication protocol.

7. The method as claimed in claim 3, wherein said communication protocol is a Virtual Terminal protocol.

8. The method as claimed in claim 3, wherein said host access security system is a Resource Access Control Facility (RACF) system.

9. A method of enabling a user at a client device to transparently log on to a legacy session with a legacy host application, without requiring change to said legacy host application, comprising steps of:

caching a digital certificate associated with said client device, or a user thereof, at a server to which said digital certificate has been provided for authentication of said client device or said user;

initiating, by said server on behalf of said client device, said legacy session with said legacy host application;

automatically responding, by said client device, to a log-on request from said legacy host application, where said log-on request is sent by said legacy host application responsive to said initiating step, by sending a log-on message in which placeholder syntax is used in place of a user identifier and password expected by said legacy host application; and before forwarding said sent log-on message from said server to said legacy host application, performing steps of:

using said cached digital certificate to obtain, at said server from a host access security system, said expected user identifier and either said expected password or a password substitute therefor which is generated by said host access security system; and replacing said placeholder syntax in said sent log-on message with said obtained user identifier and password or password substitute.

10. The method as claimed in claim 9, wherein said digital certificate is an X.509 certificate.

11. The method as claimed in claim 9, wherein said legacy session uses a 3270 legacy host communication protocol.

12. The method as claimed in claim 9, wherein said legacy session uses a 5250 legacy host communication protocol.

13. The method as claimed in claim 9, wherein said legacy session uses a Virtual Terminal communication protocol.

14. The method as claimed in claim 9, wherein said host access security system is a Resource Access Control Facility (RACF) system.

15. A system for enabling a user at a client device to transparently log on to a legacy session with a legacy host application, without requiring change to said legacy host application, comprising:

means for caching a digital certificate associated with said client device, or a user thereof, at a server to which said digital certificate has been provided for authentication of said client device or said user;

means for initiating, by said server on behalf of said client device, said legacy session with said legacy host application;

means for automatically responding, by said client device, to a log-on request from said legacy host application, where said log-on request is sent by said legacy host application responsive to said means for initiating, by sending a log-on message in which placeholder syntax is used in place of a user identifier and password expected by said legacy host application; and before forwarding said sent log-on message from said server to said legacy host application, means for performing steps of:

using said cached digital certificate to obtain, at said server from a host access security system, said expected user identifier and either said expected password or a password substitute therefor which is generated by said host access security system; and replacing said placeholder syntax in said sent log-on message with said obtained user identifier and password or password substitute.

16. The system as claimed in claim 15, wherein said digital certificate is an X.509 certificate.

17. The system as claimed in claim 15, wherein said legacy session uses a 3270 legacy host communication protocol.

18. The system as claimed in claim 15, wherein said legacy session uses a 5250 legacy host communication protocol.

19. The system as claimed in claim 15, wherein said legacy session uses a Virtual Terminal communication protocol.

20. The system as claimed in claim 15, wherein said host access security system is a Resource Access Control Facility (RACF) system.

21. A computer program product for enabling a user at a client device to transparently log on to a legacy session with a legacy host application, without requiring change to said legacy host application, said computer program product embodied on a computer-readable medium readable by a computing device in a computing environment and comprising:

computer-readable program code means for caching a digital certificate associated with said client device, or a user thereof, at a server to which said digital certificate has been provided for authentication of said client device or said user;

computer-readable program code means for initiating, by said server on behalf of said client device, said legacy session with said legacy host application;

computer-readable program code means for automatically responding, by said client device, to a log-on request from said legacy host application, where said log-on request is sent by said legacy host application responsive to said computer-readable program code means for initiating, by sending a log-on message in which placeholder syntax is used in place of a user identifier and password expected by said legacy host application; and before forwarding said sent log-on message from said server to said legacy host application, computer-readable program code means for performing steps of:
    using said cached digital certificate to obtain, at said server from a host access security system, said expected user identifier and either said expected password or a password substitute therefor which is generated by said host access security system; and
    replacing said placeholder syntax in said sent log-on message with said obtained user identifier and password or password substitute.

22. The computer program product as claimed in claim 21, wherein said digital certificate is an X.509 certificate.

23. The computer program product as claimed in claim 21, wherein said legacy session uses a 3270 legacy host communication protocol.

24. The computer program product as claimed in claim 21, wherein said legacy session uses a 5250 legacy host communication protocol.

25. The computer program product as claimed in claim 21, wherein said legacy session uses a Virtual Terminal communication protocol.

26. The computer program product as claimed in claim 21, wherein said host access security system is a Resource Access Control Facility (RACF) system.

\* \* \* \* \*

UNITED STATES PATENT AND TRADEMARK OFFICE
CERTIFICATE OF CORRECTION

PATENT NO. : 6,823,452 B1
APPLICATION NO. : 09/466625
DATED : November 23, 2004
INVENTOR(S) : Ronald P. Doyle et al.

It is certified that error appears in the above-identified patent and that said Letters Patent is hereby corrected as shown below:

Column 1, line 51,
    Change "No. 6,129,738" to --No. 6,128,738--.

Column 5, line 56,
    Change "data steam is" to --data stream is--.

Column 9, line 67,
    Change "host access credentials and system" to --host access security system--.

Column 11, line 49,
    Change "5250 emulation legacy" to --5250 legacy--.

Signed and Sealed this

Twenty-second Day of August, 2006

JON W. DUDAS
*Director of the United States Patent and Trademark Office*